United States Patent [19]

Quarles et al.

[11] Patent Number: 5,110,612
[45] Date of Patent: May 5, 1992

[54] HYDROXYPROPYL STARCH HYDROLYZATE PRODUCT

[75] Inventors: James M. Quarles; Richard J. Alexander, both of Cedar Rapids, Iowa

[73] Assignee: Penford Products Company, Cedar Rapids, Iowa

[21] Appl. No.: 577,691

[22] Filed: Sep. 4, 1990

[51] Int. Cl.$^5$ .............. A23L 1/236; A23L 1/187; A23L 1/06; A21D 8/00
[52] U.S. Cl. ............................ 426/548; 426/658; 426/549; 426/552; 426/553; 426/554; 426/579; 426/659; 426/660; 426/573; 426/577; 426/576; 426/590; 426/602; 127/29; 127/38; 127/42; 536/111
[58] Field of Search ........ 426/548, 658, 549, 552–554, 426/579, 659, 660, 573, 577, 576, 590, 602; 127/29, 38, 42; 536/111

[56] References Cited

U.S. PATENT DOCUMENTS 3,505,110  4/1970  Kesler et al. ............... 127/29
4,623,549  11/1986  Katt et al. .................. 426/548

Primary Examiner—Joseph Golian
Attorney, Agent, or Firm—Marshall, O'Toole, Gerstein, Murray & Bicknell

[57] ABSTRACT

A hydrolyzate product of hydroxypropylated starch comprising greater than about 15% by weight DP 2-6 hydrolyzate polymers and characterized by a DE value of from about 20 to about 45 is disclosed which when combined with a high potency sweetener is useful as a reduced calorie replacement for sucrose and starch hydrolyzate products in food products.

45 Claims, No Drawings

HYDROXYPROPYL STARCH HYDROLYZATE PRODUCT

BACKGROUND OF THE INVENTION

The present invention relates generally to low calorie bulking agents for use in substitutes for sucrose and other starch hydrolyzate products. More specifically, the invention relates to hydrolyzate products of starch ethers and specifically to improved hydrolyzate products of hydroxypropyl starch having particular utility as low calorie food ingredients.

Sucrose is a vital component of numerous food products not only because of the sweetness that it provides, but also because of the bulking properties provided by the crystalline sugar. In recent years, starch hydrolyzate products such as corn syrups, corn syrup solids and high fructose corn syrups have been used to partially or completely replace sucrose in many food formulations. Such starch hydrolyzate products, however, provide a sweet taste but do not appreciably reduce the calorie content of the food product to which they are added. While the sweetness associated with sucrose, other sugars and starch hydrolyzate products can be replaced in dietetic products by the addition of high potency sweeteners such as aspartame, sodium saccharine and the like, such high potency sweeteners cannot provide the bulking and texture properties required by a wide variety of food products (and including some beverages). The bulking properties associated with sucrose and starch hydrolyzate products can be critical to providing the end properties typically associated with food products generally, and with food products such as baked goods and frozen desserts in particular.

A great deal of effort has been expended in the art directed to providing reduced calorie bulking agents which can be combined with high potency sweeteners to replace sucrose and other sweet starch hydrolyzate products in food products. Materials such as cellulose derivatives have met with limited success in replacing the bulk associated with sucrose because the high viscosities associated with such products can adversely modify the textural properties of the food product in which they are incorporated. Other bulking agents for replacement of sucrose include a material known as polydextrose described in U.S. Pat. No. 4,622,233 which is a largely indigestible recombination product of glucose and sorbitol. Polydextrose is disclosed to provide about 1 calorie per gram which compares favorably with conventional carbohydrates which provide about 3.5 to 4 calories per gram but is considered to be relatively costly to produce.

Of interest to the present invention is the disclosure of Kesler, et al., U.S. Pat. No. 3,505,110 which discloses low calorie sugar products prepared by hydrolysis of hydroxypropylated starch. Kesler discloses methods for etherifying starches with propylene oxide to produce a hydroxypropyl starch which is then subjected to hydrolysis to produce a reduced calorie, non-cariogenic sucrose substitute. The hydrolysis products are characterized by a DE of from 1 to 30 and are said to be composed principally of glucose and hydroxypropylated polysaccharides and contain little or no (preferably less than 0.5%) maltose, which is a disaccharide. The patent discloses preferred methods of producing the hydrolyzate product comprising hydrolyzing the hydroxypropyl starch with a liquefying enzyme to break up the long chain starch molecules and then treating with a saccharifying enzyme to further hydrolyze the intermediate length molecules to produce glucose (having a degree of polymerization (DP) of 1) to the substantial exclusion of maltose (DP 2). The products of Kesler are said to be intended for use as substitutes for ordinary sugar and are disclosed to rely upon their own sugar content for sweetness rather than upon artificial sweetening agents. Hydroxypropyl starch hydrolyzate products made according to the art fail, however, to be characterized by bulking properties suitable for use as a sucrose replacer in a wide variety of food products.

SUMMARY OF THE INVENTION

The present invention provides bulking agents useful in low calorie substitutes for sucrose and other starch hydrolyzate products. Specifically, the invention relates to the discovery that a hydrolyzate product of hydroxypropylated starch comprising greater than about 15% by weight DP 2-6 hydrolyzate polymers and characterized by a DE value of from about 20 to about 45 has bulking agent properties similar to those of sucrose. Further, the invention provides a reduced calorie sweetener composition comprising the hydrolyzate product in combination with a high potency sweetener that can be used as a replacement for up to 100% of the sucrose and conventional starch hydrolyzate products (e.g., corn syrup, corn syrup solids) present in a wide variety of food compositions to provide a substantial reduction in calories.

One aspect of the invention relates to the discovery that hydrolyzate products of hydroxypropyl starch having DE values of from about 20 to about 45 that are characterized by having an elevated distribution of hydrolyzate products characterized by a DP of 2 to 6 have particularly improved bulking properties when compared with hydrolyzate products having the same DE values but having more bimodal (as opposed to monomodal) distribution of hydrolyzate product lengths characterized by relatively elevated levels of DP 1 sugars (glucose), reduced levels of DP 2-6 products and elevated levels of products having a DP of 7 or greater. Not only are the hydrolyzate products of the invention characterized by a substantially lower viscosity for a given DE than products of the art, but they provide substantial improvements in a variety of end properties of baked goods and other food products in which they are introduced to substitute for the presence of sucrose.

The hydrolyzate products of the invention provide a variety of improved properties to food products including improved water holding properties. In baked products, for example, the hydrolyzate products function to preserve freshness by preventing drying. The hydrolyzate products also contribute improved freeze-thaw stability to products in which they are incorporated because the modified carbohydrate molecules tend not to retrograde so as to cause syneresis of the food product in which they are incorporated. In addition, the hydrolyzate products provide improved properties with respect to inhibition of water crystal formation in food products in which they are incorporated.

Sweetener compositions comprising the hydroxypropyl starch hydrolyzate products of the invention in conjunction with a high potency sweetener can also be substituted for starch hydrolyzate products in food products. Improved reduced calorie food products can thus be produced according to the invention by replacing all or a portion of the sucrose or starch hydrolyzate product present in a food product with the hydrolyzate product of hydroxypropyl starch in combination with a high potency sweetener.

In addition to being incorporated into traditional food products, the sweetener compositions comprising the hydroxypropyl starch hydrolyzate products in dry form with a high potency sweetener can also be used as a granulated table top sugar substitute. Preferred compositions may be prepared such that the composition has the sweetness of sucrose on a per weight basis and shares the appearance and texture of sucrose such that they can be measured and poured in the same manner as sucrose.

DETAILED DESCRIPTION

The present invention provides an improved low calorie bulking agent comprising a hydrolyzate product of hydroxypropylated starch comprising greater than about 15% by weight DP 2-6 hydrolyzate polymers and characterized by a DE value of from about 20 to about 45. When combined with a high potency sweetener, the bulking agent provides a sucrose substitute for use in a variety of reduced calorie food products. It has been found that hydrolyzate products of hydroxypropylated starch having such elevated levels of "middle range" starch polymers, and accordingly reduced levels of glucose (DP 1) and longer chain polymers (DP 7+), exhibit improved properties as food ingredients at any given DE value when compared with hydroxypropyl starch hydrolyzate products characterized by reduced levels of DP 2-6 starch polymers and elevated levels of DP 1 monomers and DP 7+ starch polymers. The bulking agent/sweetener combination provides the same textural and mouthfeel properties as sucrose and starch hydrolyzate products such as corn syrups, and also provides the same functional properties to foods such as baked goods, frozen dessert products and the like.

The bulking agent of the invention comprises a preferred hydrolyzate product of hydroxypropylated starch characterized by an elevated distribution of "middle range" hydrolyzate products ranging from DP 2 to DP 6. The weight percentage of DP 2-6 starch polymers must be greater than about 15% with between about 20% and 30% being particularly preferred. The hydrolyzate products are further characterized by a DE value of from about 20 to about 45, with preferred values ranging from about 25 to about 40. The preferred DE value for any given food application will depend on the circumstances of the qualities of that food product and may readily be determined by one of ordinary skill in the prior art. In general, the lower the DE value, the more viscous will be the hydrolyzate product. The hydrolyzate products of the invention are generally characterized by lower viscosities than are prior art hydroxypropyl starch hydrolyzate products with equivalent DE values. Preferred products of the invention are characterized by a Brookfield viscosity of from about 50 cps to about 300 cps when measured in a 60% by weight solids solution at room temperature, with a Brookfield viscosity of from about 70 cps to about 250 cps under the same conditions being particularly preferred. As with DE values, the most preferred viscosity for a given end use will depend upon the details of that end use and may be determined by one of ordinary skill in the art.

Lower DE value hydrolyzate products will tend to comprise lower levels of dextrose and higher levels of long chain polymers of DP 7 or greater. Hydrolyzate products having DE levels lower than about 20 (i.e., in the maltodextrin range) are generally not useful as sucrose replacers in prepared food products because they are characterized by an excessively high viscosity.

Higher DE value hydrolyzate products will tend to comprise higher levels of dextrose and DP 2-6 starch polymers and lower levels of long chain polymers of DP 7 and greater. Such products may have a greater caloric value for a given hydroxypropyl substitution level than will lower DE materials, but will have a lower viscosity which may make them preferable for certain end uses. Hydrolyzate products having DE levels higher than about 5 are also generally unsuitable for use as low calorie sucrose replacers because of their relatively high caloric value. Although the presence of hydroxypropyl groups on the longer starch polymers interferes with the digestion of those polymers to yield caloric value, the hydrolysis of products having DE values in excess of 45 is so extensive that numerous unblocked short chain or single monomer sugar molecules are available to provide caloric value beyond the level which is generally desirable for a low calorie bulking agent.

The products of the present invention are produced by a controlled hydrolysis of hydroxypropylated starch to yield a desired distribution of hydrolyzate products. Hydroxypropylated starches useful as starting materials for producing the product of the invention may be produced form a variety of starch materials according to methods known in the art. Suitable starch materials include, but are not limited to, starches such as corn, waxy corn, wheat, potato, tapioca and sorghum starches. Suitable methods for hydroxypropylating such starches include those described in Kesler, U.S. Pat. No. 3,505,110; Hjermstad, U.S. Pat. No. 3,577,407; Eastman, U.S. Pat. No. 4,452,978; and Eastman, U.S. Pat. No. 4,837,314, the disclosures of which are hereby incorporated by reference. The hydroxypropylated starch materials should have a level of hydroxypropyl substitution sufficient to substantially reduce the caloric content of the starch and its hydrolyzate. The starch materials should comprise greater than about 8% (by weight) hydroxypropyl substitution and preferably between about 9% and about 15% (by weight) hydroxypropyl substitution. In general, the higher the level of hydroxypropyl substitution, the greater the number of blocking groups interfering with digestion, and the lower the caloric value. It is generally desired that products hydrolyzed to higher DE levels be substituted to higher levels in order that hydroxypropyl groups be present on the greater numbers of hydrolyzed starch segments. While the degree of hydroxypropyl substitution can conceivably be as high as 1.0 D.S. or 26.5% (by weight), such complete substitution is not considered necessary for the practice of the invention.

The hydrolyzate product of the invention is produced by the method of treating the hydroxypropylated starch by acid hydrolysis, either alone or in conjunction with enzyme hydrolysis, with enzyme hydrolysis either preceding or following the acid hydrolysis step. Suitable enzymes include a-amylases including bacterial and fungal a-amalyses with bacterial a-amalyses being preferred. According to a preferred method of practicing the invention, hydroxypropyl starch is first hydrolyzed by means of an α-amylase enzyme to a DE of from about 2 to about 15. In general, α-amylase hydrolysis will proceed to a maximum DE of about 15. The hydrolyzate product is then acid hydrolyzed to a desired DE between about 20 and about 45.

The present invention provides reduced calorie sweetener compositions comprising hydrolyzate products of hydroxypropylated starch comprising greater than about 15% by weight DP 2-6 hydrolyzate polymers and characterized by a DE value of from about 20 to about 45 combined with a high potency sweetener. Suitable high potency sweeteners would be apparent to those of ordinary skill in the art with preferred sweeteners including dipeptide sweeteners such as aspartame, alitam, proteinaceous sweeteners such as monellin and thaumatin and other sweeteners such as acesulfame K, sodium saccharine, cyclamates and sucralose.

According to one embodiment of the invention, the sweetener composition is prepared such that it has the sweetness of sucrose on a per weight basis. In addition, the hydrolyzate product is preferably prepared such that the sweetener composition comprises less than 2 calories per gram and most preferably about 1 calorie per gram or less. According to one embodiment of the invention, the hydrolyzate product may be dried and granulated and prepared such that it has the sweetness on a per weight basis of sucrose and it is suitable for table top uses such as for addition to coffee or breakfast cereal. The granulated sweetener composition preferably has the sweetness of sucrose on a per weight basis and is preferably characterized by comprising less than 2, and most preferably less than 1, calorie per gram.

The invention further provides methods for reducing the calorie content of food products comprising sucrose or starch hydrolyzate products such as corn syrups, corn syrup solids or high fructose corn syrups. According to the method of the invention, all or a portion of the sucrose or starch hydrolyzate product may be replaced with the hydroxypropyl starch hydrolyzate product of the invention. The hydrolyzate produce of the invention is capable of reproducing the bulking and texture qualities provided by the removed sucrose or starch hydrolyzate while providing significantly fewer calories than the materials which it replaces. The sweetness provided by the removed sucrose or starch hydrolyzate may in turn be replaced in whole or in part by incorporation of a high potency sweetener.

Improved food products of the invention include virtually any food product comprising significant sucrose or starch hydrolyzate products. The invention is most suited for those food products comprising substantial levels of sucrose or starch hydrolyzate products and which then contribute substantial quantities of calories to the food product. Food products which are particularly suited for practice of the invention include baked goods; frozen dessert products such as ice milks, ice creams, quiescent frozen confections, and the like; icings and frostings; dessert fillings such as for cakes or pies, puddings; confections; jams, jellies and preserves; dry beverage mixes; gelatin based desserts;, salad dressings including pourable and spoonable salad dressings; and syrups and dessert toppings such as chocolate syrups.

Set out below are examples illustrating various aspects of the present invention.

EXAMPLE 1

Alpha-Amylase/Acid Hydrolysis of HP Starch

In this example, a hydrolyzate product of hydroxypropyl starch characterized by a DE of 8.3 was produced according to the following method. Ten (10) gallons of tap water comprising 100 ml of alpha-amylase (Canalpha from Biocon (U.S.) Inc.) was heated to 165°-170° F. in a steam jacketed, 30 gallon reaction vessel and 11.0 kg of hydroxypropyl corn starch characterized by having hydroxypropyl substitution of 9.9% was slowly added to the solution. The starch was hydrolyzed for six hours and the reaction temperature was increased to 210°-220° F. for 15 minutes to inactivate the enzyme and to insure thorough starch gelatinization. A 150 ml quantity of 12 N HCl was then added and acid hydrolysis conducted for six hours at 165°-170° F. The hydrolyzate was then adjusted to pH 6.0-7.0 with NaOH and refined (filtered through diatomaceous earth and ion exchanged) and spray dried. The final product, a hydroxypropyl maltodextrin, was characterized by a DE of 8.3 and contained less than 1% residual propylene glycol and less than 0.1% ash.

EXAMPLE 2

Alpha-Amylase/Acid Hydrolysis of HP Starch

In this example, a hydrolyzate product of hydroxypropyl starch characterized by a DE of 19.8 was prepared according to the following method. Eighty (80) pounds of the hydroxypropyl starch of Example 1 was slowly added to a pilot plant jacketed reaction vessel which contained 90 pounds of tap water and 250 ml of alpha-amylase (Canalpha) and the starch was hydrolyzed for seven hours at 160°-170° F. The solution was heated to 210°-220° F. for 20 minutes to inactivate the enzyme and the hydrolyzate was cooled to room temperature. A five gallon aliquot was then removed for refining and spray drying. To the remainder of the hydrolyzate, 750 ml of 12 N HCl was added and the dispersion was reacted at 170° F. for eight hours. The final solution was adjusted to pH 6.0-7.0 with NaOH and refined and spray dried. The final product had a DE of 19.8, and contained less than 0.05% ash and less than 0.5% propylene glycol.

EXAMPLE 3

Alpha Amylase/Acid Hydrolysis of HP Starch

In this example, forty-seven pounds of the hydroxypropyl starch of Example 1 was slurried into 15 gallons of tap water at 160° F. containing 150 ml of alpha-amylase (Canalpha). This dispersion was heated for one hour, and the temperature was raised to 210° F. for two hours to insure complete starch gelatinization. The solution was cooled to 170° F. and an additional 200 ml of alpha-amylase added and the hydrolysis was conducted for two hours. Then acid hydrolysis was conducted by adding 750 ml of 12 N HCl such that a 10 ml aliquot gave a titer of 15 ml of 0.1 N NaOH. This acid hydrolysis reaction was allowed to proceed for 11.5 hours at 170° F. The hydrolyzate was adjusted to pH 6.0-7.0 with NaOH, and then refined and spray dried. The final product, a hydroxypropyl corn syrup solids, had a DE of 22.5, less than 1% propylene glycol, less than 0.05% ash and below the minimum detection concentration of 0.5 ppm propylene chlorohydrin.

EXAMPLE 4

Alpha Amylase/Acid Hydrolysis of HP Starch

In this example, the procedure of Example 3 was repeated with the difference that acid hydrolysis was continued such that the resulting product had a DE of 26.1.

EXAMPLE 5

Acid/Enzyme Hydrolysis of HP Starch

In this example, fifty (50) pounds of the hydroxypropyl starch of Example 1 (9.9% HP) was added to 12.5 gallons of water containing 750 ml of 12 N HCl and reacted at 190°-200° F. for 45 minutes. The temperature was lowered to 170°-180° F. and the hydrolysis was continued for two hours, or until analysis by the DP 1 to DP 6 fraction comprised 13.8% by weight of the product. The reaction mixture was then neutralized to pH 6-7 by addition of 30% NaOH. A 250 ml quantity of alpha amylase (Canalpha) was then added and hydrolysis was continued at a temperature of 170°-180° F. for about 24 hours. The final product had a DE of 19.1 and a DP 2 to DP 6 concentration of 18.2.

EXAMPLE 6

Acid/Enzyme Hydrolysis of HP Starch

In this example, the method of Example 5 was repeated with the exception that acid hydrolysis was conducted for 2.5 to 3 hours resulting in a product wherein the DP 1-6 fraction was 19.7% by weight of the product. The enzymatic hydrolysis was then carried out by addition of 200 ml alpha amylase (G-ZYME E995, Enzyme Development Corp., New York, New York) and conducting enzyme hydrolysis for 4 to 4.5 hours. The reaction mixture was heated to 210° to 220° F. for 20 minutes to inactivate the enzyme and was then cooled, refined and spray dried. The final product had a DE of 21.1 and a DP 2-6 concentration of 20.3.

EXAMPLE 7

Alpha Amylase/Acid Hydrolysis of HP Starch

In this example, the reaction conditions described in Example 3 were essentially repeated except that the acid hydrolysis was conducted for 18 hours instead of 11.5 hours. The final hydroxypropyl corn syrup solids was characterized by a DE of 27.8, and contained less than 0.5% propylene glycol and less than 0.1% ash.

EXAMPLE 8

Alpha Amylase Hydrolysis of HP Starch

In this example, the alpha-amylase hydrolysis of Example 3 was repeated but without acid hydrolysis. The final hydrolyzate was then inactivated by heating to 210°-220° F. for 20 minutes and the product was refined by conventional techniques such as filtration through diatomaceous earth, bleaching with powdered carbon and passing through ion exchange columns and spray dried. The final hydroxypropyl maltodextrin was characterized by a DE of 14.6, and contained less than 0.5% propylene glycol and less than 0.05% ash.

EXAMPLE 9

Acid Hydrolysis of HP Starch

In this example, 660 grams of the hydroxypropyl corn starch of Example 1 was slowly added to 1000 ml of tap H$_2$O, containing 30 ml of 12 N HCl, and reacted at 180°-200° F. for 210 minutes. The product was then adjusted to pH 6.0-7.0 with NaOH. The hydrolyzate was refined and then concentrated on a rotoevaporator obtain a solid product. The final product had a DE of 22.7.

EXAMPLE 10

Acid Hydrolysis of HP Starch

In this example, 660 g of the hydroxypropyl corn starch of Example 1 was slowly added to 1000 grams of tap water containing 30 ml of 12 N HCl at 160° F. The dispersion was heated to 180°-190° F. and held for 143 minutes. The dispersion was adjusted to pH 6.0-7.0 with NaOH and refined and was finally concentrated and solidified on a rotary evaporator. The final product was characterized by a DE of 16.2.

EXAMPLE 11

Low Caloric Value of HP Maltodextrins & HP Corn Syrup Solids

In this example, the low calorie properties of hydroxypropyl maltodextrins and the products of the invention were evaluated. Samples of different hydrolyzed hydroxypropyl starches having hydroxypropyl substitution levels of 2.6%, 4.7% and 9.9% were tested to determine their caloric content according to a standard assay published by E. E. Rice, Journal of Nutrition, 61:253, 1957. They were compared to a standard basal diet, plus a basal diet to which sucrose had been added. The results are shown in Table 3.

The data indicated that products made with comparable DEs from hydroxypropyl starch with about 10% HP groups contributed only about 1.0 calories per gram to the diet while products with lower levels of HP groups possessed over 2.0 calories per gram.

TABLE 1

Caloric Values Determined on HP Maltodextrins or Corn Syrup Solids

| Sample | HP Content of Starting Starch | DE of Maltodextrin or Syrup Solids | Calories per Gram |
|---|---|---|---|
| Product of Example 3 | 9.9 | 22.5 | 1.14 |
| Product of Example 4 | 9.9 | 26.1 | 1.11 |
| Product of Example 5 | 9.9 | 19.1 | 1.15 |
| Product of Example 6 | 9.9 | 21.1 | 1.13 |
| Product of Example 7 | 9.9 | 27.8 | 1.23 |
| Product of Example 8* | 9.9 | 14.6 | 0.99 |
| Product Made According to the Procedure of Example 8* | 2.6 | 21.7 | 2.17 |
| Product Made According to the Procedure of Example 8* | 4.7 | 29.2 | 2.35 |
| Product of Example 12 | 9.9 | 25.2 | 0.90 |
| Product of Example 16 | 9.9 | 25.0 | 0.79 |
| Product of Example 17 | 9.9 | 41.3 | 1.85 |

*The products of Example 8 and those produced according to the procedure of Example 8 had different DE levels as a result of both differing hydroxypropyl contents and differing hydrolysis times.

EXAMPLE 12

Converted Product

Acid

In this example, 48 lbs. of the hydroxypropyl starch of to Example 1 (9.9% HP substitution) was slurried in 15-16 gallons of tap water to which 250 ml of 12 N HCl was added. The dispersion was hydrolyzed at 180°-190° F. for about 15 hours, or until the product containing 25.2 DE was obtained. The product was then adjusted to pH 6-7, refined and spray dried. The final product was characterized by a Brookfield viscosity of 140 cps at 60% solids concentration at room temperature.

EXAMPLE 13

Acid/Enzyme Converted Product

In this example, 70 lbs. of the hydroxypropyl starch of Example 1 (9.9% HP substitution) was slurried into 18 gallons of tap water to which 250 ml of 12 N HCl was added. The dispersion was hydrolyzed at 170° F. for 7.5 hours. Then a one-gallon aliquot was removed, adjusted to pH 6.0 and treated with 300 ml of alpha amylase (Canalpha) for 4 hours at 180°-190° F. The product of the acid/enzyme hydrolysis was characterized by a Brookfield viscosity of 160 cps at 60% solids concentration at room temperature. HPLC analysis of the product of 9A and 9B indicated that the products were very similar with respect to distributions of glucose and oligosaccharides. (See Table 11.)

EXAMPLE 14

In this example, a comparison was made between standard white cakes including sucrose and those in which 50% of the sucrose was replaced with either a hydroxypropyl starch hydrolyzate product of the invention with a DE of 25.2 (Example 12) or with a hydroxypropyl maltodextrin with a DE of 14.6 (Example 8). The cakes were prepared according to the recipe set out in Table 2 and were characterized by the batter viscosities and final properties as shown in Table 3.

As can be seen from the data in Table 3, the cake in which 50% of the sucrose by weight was replaced with the material of the invention with a DE of 25.2 was comparable to the control cake comprising 100% sucrose and was greatly superior to the cake in which 50% of the sucrose by weight was replaced with the maltodextrin product which had been hydrolyzed by enzymes only and which had a DE of 14.6. The hydrolyzate product of the invention caused some increase in batter viscosity, but resulted in a cake that was essentially the same as the control. In contrast, hydroxypropyl maltodextrin was difficult to disperse, and never became completely dispersed in the liquid portion of the cake mix. The cake comprising the maltodextrin had a poor texture and a volume only 50% that of the sucrose containing control. In addition, the cake absorbed large quantities of water on standing and became very moist.

TABLE 2

Formula for Standard White Cake Mix

| Ingredients | Amount (grams) |
| --- | --- |
| Flour | 211 |
| Baking Powder | 11 |
| Salt | 3.2 |
| Egg Whites | 94.7 |
| Butter | 112 |
| Sucrose | 244 |
| Vanilla | 2.4 |
| Milk | 180 |

TABLE 3

Batter Viscosities & Cake Properties of Products from Example 14

| Product | Carbohydrate Viscosity, cps | Cake Batter Viscosity, cps | Cake Properties |
| --- | --- | --- | --- |
| Control (100% Sucrose) | — | 3180 | Good cake volume and texture; cake remained dry on standing. |
| Maltodextrin from Example 8 (DE = 14.6) | 3250 | 6000 (product) did not disperse well in liquid portion; (remained lumpy) | Poor cake volume and texture; volume 50% control; cake absorbed water on standing and became very moist. |
| Corn Syrup Solids From Example 12 (DE = 25.2) | 140 | 5840 | Good cake volume and texture; volume 100% of control; remained dry on standing. |

In the following examples, four different hydroxypropyl starch hydrolyzates were compared as bulking agents in baked goods. Three of the products were made according to the procedures of the invention (i.e., two by enzyme/acid hydrolysis and one by acid hydrolysis of hydroxypropyl starch). The remaining product was produced according to the enzyme/enzyme hydrolysis taught by Example I of Kesler, et al., U.S. Pat. No. 3,505,110.

EXAMPLE 15

This product is the acid converted product described in Example 12. The product had a DE of 25.2 and 21.6% by weight DP 2-6 hydrolyzate polymers and was made by partial hydrolysis of the hydroxypropyl starch of claim 1 using acid alone. The product is characterized by the distribution of hydrolyzate products disclosed in Table 11.

EXAMPLE 16

This product is an alpha amylase/acid hydrolyzed product made from the hydroxypropyl starch of Example 1 and prepared according to procedures described in Examples 3 and 4. Here the hydroxypropyl starch was treated with alpha amylase for four hours at 180°-190° F. followed by acid hydrolysis with 12 N HCl for 4.5 hours at 190° F. The final product had a DE of 25.0 and 22.1% DP 2-6 hydrolyzate polymers.

EXAMPLE 17

This product is an alpha amylase/acid hydrolyzed product made from HP starch according to Example 1 and prepared according to procedures described in Example 3. According to this example, the hydroxypropyl starch was treated with alpha amylase for four hours at 180°-190° F. Then 12 N HCl was added and the acid hydrolysis conducted for nine hours at 190° F.

until the final product had a DE of 41.3 and 29.3% DP 2-6 hydrolyzate polymers.

EXAMPLE 18

This product is an alpha amylase/glucoamylase hydrolyzed product made according to Example I of Kesler, U.S. Pat. No. 3,505,110. The hydroxypropyl starch was prepared in an aqueous isopropanol system according to Kesler and was hydrolyzed according to the methods of Example I of that patent using alpha amylase (Canalpha, Biocon USA) and glucoamylase (G-ZYME G-990-220, Enzyme Development Div., Biddle Sawyer Corp.). The resulting hydrolyzate product had a DE of 25.7 and 10.1% by weight DP 2-6 hydrolyzate polymers.

Discussion

Products 15, 16, and 18 were all characterized by essentially the same DE of 25 (see Table 4) despite the fact that they were hydrolyzed according to different processes. Nevertheless, the carbohydrate distributions were quite different. Product 18 made according to the method of the Kesler patent had a much higher level of glucose, much lower oligosaccharide level (DP 2-6) and somewhat higher DP 7+ concentration than products 15 and 16. While products 15 and 16 were characterized by viscosities of 140 and 160 cps in 60% aqueous solution, the Kesler product 18 was much higher at viscosity of 580 cps under comparable conditions. The levels and nature of higher polysaccharides are believed to have a pronounced effect on viscosity. While the hydrolyzate products of the invention are characterized by significantly lower viscosities than those of the prior art having comparable DE values, the significantly improved utility of those products is not believed to be exclusively a function of the viscosity of the products.

TABLE 4
Description and Analysis of Hydrolyzate Products

| Product | DE | % DP 1 | % DP 2-6 | % DP 7+ | Viscosity 60% cps |
|---|---|---|---|---|---|
| Control (Sucrose) | — | — | — | — | — |
| 15 | 25.2 | 8.6 | 21.6 | 69.8 | 140 |
| 16 | 25.0 | 12.3 | 22.1 | 65.6 | 160 |
| 17 | 41.3 | 28.1 | 29.3 | 42.6 | 80 |
| 18 | 25.7 | 16.9 | 10.1 | 73.0 | 580 |

EXAMPLE 19

In this example, white and chocolate layer cakes were prepared according to the standard recipes set out below using either sucrose as a control or the hydroxypropyl starch hydrolyzate products of 15, 16, 17 or 18 in the place of the sucrose.

TABLE 5
Formula and Procedure for White Layer Cake

| Ingredients | Amount Volume | Grams |
|---|---|---|
| Cake flour | 2 cups | 214.0 |
| Baking powder | 2¼ tsp. | |
| Salt | ¼ tsp. | |
| Butter | ½ cup | 105.0 |
| Sucrose | 1 cup | 220.0 |
| Lemon extract | ¼ tsp | |
| Vanilla | ½ tsp. | |
| Egg whites | 4 large eggs - ½ cup | 123.1 |
| Milk, 2% fat | ½ cup | 117.9 |

Procedure

The flour was sifted, measured and resifted three times with baking powder and salt. The butter was creamed until soft and smooth and ¾ cup of sugar was gradually added and blended thoroughly. The flavorings were then stirred in. Half of the egg whites were added unbeaten and the mixture was beaten vigorously until the mixture was light and fluffy. The flour mixture and milk were added alternately in four or five portions, beginning and ending with flour and beating well after each addition. In a separate bowl, the remaining eggs were beaten until stiff and the remaining ¼ cup of sugar was gradually beat in. This was then folded lightly but thoroughly into the batter and turned into two 8-inch cake pans which have been lined with wax paper in bottom. These were baked at 350° F. for 28 to 30 minutes or until cake springs back when lightly pressed with finger tips. The cakes were cooled in the pans for 5 minutes, then turned out onto cake coolers and allowed to cool before the paper was removed.

TABLE 6
Formula and Procedure for Chocolate Layer Cake

| Ingredients | Amount Cups, etc. | Grams |
|---|---|---|
| Cake flour | 2 cups | 214.0 |
| Baking soda | ¼ tsp. | |
| Baking powder | 1½ tsp. | |
| Salt | ¼ tsp. | |
| Cocoa | ⅓ cup | 30.0 |
| Butter | ⅔ cup | 150.5 |
| Sucrose (granulated) | 1½ cups | 330.0 |
| Eggs, beaten | 2 | 101.6 |
| Vanilla | 1 tsp. | |
| Buttermilk | ½ cup | 125.7 |
| Boiling water | ½ cup | 120.0 |

Procedure

The flour was sifted, measured and resifted three times with baking soda, baking powder and salt. The butter was creamed until soft and the sugar added and blended thoroughly into the mixture. The eggs were beaten and added to the butter and beaten thoroughly until they were light and fluffy. The vanilla was then stirred into the mixture. The flour mixture and buttermilk were added alternatively in several portions, beginning and ending with flour and beating well after each addition. Boiling water was added all at once and stirred quickly until the mixture was smooth. The batter was then turned into two ungreased 8-inch cake pans which had been lined with wax paper on their bottom. The cakes were baked at 350° F. for 30 minutes and cooled in their pans for 5 minutes and turned out onto cake coolers. The cakes were cooled and put together with icing.

The differences in hydrolyzate polymer distributions had dramatic effects on the functionality of the products in both white and chocolate cakes. As seen in Table 7, the cakes made with products 15 and 16, the novel products of the current invention, were comparable, if not superior, to the cakes made with 100% sucrose. The cakes made with product 18, having a similar DE but significantly lower levels of DP 2-6 hydrolyzate polymers, were totally unacceptable.

The cakes made with product 17, the 41.3 DE enzyme/acid converted product, were included to show the range of utility of products made by the invention.

Cakes made with product 17, which had an elevated level of DP 2-6 hydrolyzate polymers, were comparable to cakes made with products 15 and 16, demonstrating the utility of the hydrolyzate materials of the invention with higher DE levels for use in food products such as baked goods.

TABLE 7

Description and Analysis of Cakes Incorporating Hydrolyzate Products

| Product | Cake 1* (White) | | Cake 2 (Chocolate) | | |
|---|---|---|---|---|---|
| | Height (mm) | Visual Observations | Batter Visc. (cps) | Height (mm) | Visual Observations |
| Control (Sucrose) | 28 | Good crumb structure; some browning on cake top. | 4,400 | 35 | Good texture; moist cake. |
| 15 | 29 | Similar to control; less browning. | 6,000 | 35 | Same as control. |
| 16 | 33 | Better cake volume; similar structure to control; less browning. | 6,800 | 32 | Same as control. |
| 17 | 31 | Similar to control; less browning. | 400 | 38 | Same as control. |
| 18 | 15 | Very low cake height and volume; heavy skin formation and very sticky texture. | 10,000 | 19 | Heavy Skin on top surface; collapsed grain structure; cake wet and sticky. |

*Measurement of batter viscosity was not possible for Cake 1 because of the foamy nature of the batter.

EXAMPLE 20

In this example, one of the products of the invention, (i.e. product 16) was compared against a sucrose control and against a negative control comprising neither sucrose nor any other bulking agent in an angel food cake formulation. This formula and the procedure used to make the cakes are shown in Table 8 below.

TABLE 8

Angel Food Cake Formula

| Ingredients | By Volume | Quantity By Weight, g |
|---|---|---|
| Egg whites (room temp.) | 1¾ cups | 425 |
| Sifted cake flour | 1¼ cups | 138 |
| Sucrose (granulated)* | 1¾ cups | 360 |
| Salt | ½ tsp. | |
| Cream of Tartar | 1½ tsp. | |
| Vanilla extract | 1 tsp. | |
| Almond extract | ½ tsp. | |

*The sucrose was replaced 100% with the product of the invention in the experimental angel food cake.

Procedure

The flour was sifted three times with ¾ cup sucrose. In a separate bowl, egg whites were beaten with cream of tartar, vanilla, almond extract and salt, and one cup of sugar was gradually added until egg whites were stiff. The flour/sucrose blend was then folded into the mixture which was placed in ungreased angel food cake pan and baked at 375° F. for 30 to 35 minutes.

The cake made with product 16 was fairly comparable to the control made with sucrose. Cake height was slightly lower at 7.5-8 cm compared with 9.5-10 cm for the sucrose control and had good coloration with texture similar to the control. In contrast, the angel food cake containing neither sucrose nor the hydrolyzate product of the invention was very heavy with a height of 5.0 cm. During baking, the cake rose very unevenly to produce a final product having a heavy french bread-like texture.

EXAMPLE 21

In this example, product 16 was compared against a sucrose control and against a negative control comprising neither sucrose nor any other bulking agent in a fudge brownie formulation according to the recipe set out in Table 9 below.

TABLE 9

Fudge Brownie Mix and Procedure Formula

| Ingredients | Quantity, By Volume |
|---|---|
| Margarine | ½ cup (1 stick) |
| Unsweetened chocolate | 2 squares |
| Sucrose (granulated) | 1 cup |
| Eggs | 2 Grade A Large |
| Walnuts, chopped | 4 oz. can (1 cup) |
| All-purpose flour | ½ cup |
| Vanilla extract | ½ tsp. |
| Salt | ¼ tsp. |

According to the method, the margarin chocolate were melted over low heat in a 2-quart sauce pan with frequent stirring. The sauce pan was removed from the heat and the sugar and eggs were beat in with a wire whisk or spoon until well blended. The nuts, flour, vanilla and salt were then stirred into the mixture. The mixture was poured into a greased 8-inch square baking pan and was baked for 30 to 35 minutes until a toothpick inserted into the center cam out clean. The pan was then cooled on a cooling rack.

The brownies made with product 16 substituted for 100% of the sucrose were fairly comparable to the control made with sucrose. The texture of the two products was identical. The control had a cake height of 2.3 cm, while that made with product of the invention was 2.1 cm. Both sucrose and product 16 produced a heavy-textured brownie. The brownies made with neither sucrose nor the hydrolyzate product of the invention had a cake height of only 1.0 cm and a large amount of liquid separated from the dough during baking. The brownie was very firm, oily and undesirable.

EXAMPLE 22

In this example, product 16 was compared against a sucrose control and against a negative control comprising neither sucrose nor any other bulking agent in a sugar cookie formulation. Sugar cookies were then produced according to the formula of Table 10 and the procedure set out below.

TABLE 10

| Sugar Cookie Formula | |
|---|---|
| Ingredients | Quantity, By Volume |
| All purpose flour | 2½ cups |
| Margarine (softened) | ¾ cup (1½ sticks) |
| Sugar* | ⅜ cup |
| Milk | 2 Tblsp. |
| Baking powder | 1 tsp. |
| Almond extract | 1 tsp. |
| Salt | ½ tsp. |
| Eggs | 2 Grade A Large |

*The sugar was replaced 100% with the product of the invention in the sugar cookies.

According to this example, all the ingredients were measured into a large bowl and beat with a mixer at low speed until they were well blended, occasionally scraping bowl with rubber spatula. The dough was shaped into a ball; wrapped in plastic wrap and refrigerated for 2-3 hours until it was easy to handle.

On lightly floured surface, 45 grams of dough was placed and flattened using a floured glass bottom to a desired size of about 3.5 inches. The dough was spaced about 1 inch apart on a large greased cookie sheet. The cookies were baked at 350° F. for 12 minutes, or until lightly browned and were removed with a pancake turner to wire racks to cool completely.

The cookies made with produce 16 substituted for 100% of the sucrose were very comparable to the control made with sugar. The texture of both was somewhat cake-like. Cookie height and spread were comparable with both carbohydrate ingredients. The cookies made with sucrose were slightly cracked on the top surface of the cookies. The cookies made with the product of the invention were smooth on their surfaces. The cookie dough made with neither sucrose nor the hydrolyzate product of the invention was very dense and exhibited some oil separation. The dough would not spread on the cookie sheet and produced a very irregular cookie with much less spread than the control or the cookie made with the hydrolyzate product of the invention.

Numerous modifications and alternative embodiments of the invention will be apparent to those skilled in the art in view of the foregoing description. Accordingly, this description is to be construed as illustrative only and only such limitations should be placed on the invention as are set out in the following claims.

TABLE 11

| | | DE and Carbohydrate Composition of the Hydroxypropyl Hydrolyzate Products Described in the Examples | | | | | | | |
|---|---|---|---|---|---|---|---|---|---|
| Example | DE | DP 1 | DP 2 | DP 3 | DP 4 | DP 5 | DP 6 | DP 2-6 | DP 7+ |
| 1 | 8.6 | 1.9 | 1.9 | 1.4 | 1.1 | 1.4 | 1.3 | 7.1 | 91.0 |
| 8 | 14.6 | 4.4 | 5.4 | 2.9 | 2.3 | 2.4 | 0.8 | 13.8 | 81.8 |
| 10 | 16.2 | 3.1 | 3.2 | 2.4 | 1.6 | 1.2 | 0.8 | 9.2 | 87.7 |
| 5 | 19.1 | 3.7 | 5.2 | 4.5 | 2.9 | 3.5 | 2.1 | 18.2 | 78.1 |
| 3 | 19.8 | 8.0 | 6.9 | 4.1 | 2.6 | 1.6 | 0.6 | 15.8 | 76.2 |
| 6 | 21.1 | 5.0 | 5.4 | 4.5 | 3.3 | 4.4 | 2.7 | 20.3 | 74.7 |
| 9 | 22.7 | 7.2 | 5.8 | 4.6 | 3.1 | 2.0 | 1.6 | 17.1 | 75.7 |
| 16 | 25.0 | 12.3 | 9.1 | 6.2 | 3.7 | 2.2 | 0.9 | 22.1 | 65.6 |
| 12 | 25.2 | 8.6 | 7.9 | 6.4 | 3.7 | 2.3 | 1.3 | 21.6 | 69.8 |
| 13 | — | 6.7 | 7.2 | 5.2 | 3.2 | 3.8 | 1.8 | 21.1 | 72.1 |
| 18 | 25.7 | 16.9 | 4.9 | 0.7 | 3.3 | 0.7 | 0.5 | 10.1 | 73.0 |
| 4 | 26.1 | 9.0 | 8.0 | 5.5 | 3.4 | 1.8 | 0.9 | 19.6 | 54.3 |
| 7 | 27.8 | 10.1 | 7.7 | 5.0 | 3.0 | 2.0 | 0.9 | 18.6 | 71.3 |
| 17 | 41.3 | 28.1 | 14.7 | 7.6 | 4.0 | 2.1 | 0.9 | 29.3 | 42.6 |

What is claimed is:

1. A hydrolyzate product of hydroxypropyl starch comprising greater than about 15% by weight DP 2-6 hydrolyzate polymers and characterized by a DE value of from about 20 to about 45.

2. The hydrolyzate product of claim 1 comprising from about 20% to about 30% by weight DP 2-6 starch polymers.

3. The hydrolyzate product of claim 1 wherein said DE value is from about 25 to about 40.

4. The hydrolyzate product of claim 1 which is characterized by a Brookfield viscosity of from about 70 cp to about 250 cps when measured in a 60% by weight solids aqueous solution at room temperature.

5. The hydrolyzate product of claim 1 wherein said hydroxypropylated starch has a hydroxypropyl degree of substitution of greater than about 9%.

6. A method for the preparation of a hydrolysis product of hydroxypropyl starch comprising treating hydroxypropylated starch under hydrolysis conditions selected to produce a product comprising greater than about 15% by weight DP 2-6 hydrolyzate polymers and characterized by a DE value of from about 20 to about 45 wherein at least a portion of said hydrolysis occurs during an acid hydrolysis step.

7. The method of claim 6 further comprising the step of treating a member selected from the group consisting of said hydroxypropyl starch and the hydrolysis product of said acid hydrolysis step with a hydrolytic enzyme under conditions selected to hydrolyze said starch or said hydrolysis product.

8. The method of claim 7 wherein said hydrolytic enzyme is an α-amalyse.

9. The method of claim 6 wherein said hydroxypropylated starch has a hydroxypropyl degree of substitution of greater than about 9%.

10. A hydrolyzate product produced according to the method of claim 6.

11. A reduced calorie sweetener composition comprising the hydroxypropyl starch hydrolyzate product of claim 1 and a high potency sweetener.

12. The sweetener composition of claim 11 wherein said high potency sweetener is selected from the group consisting of aspartame, alitame, acesulfame K, sodium saccharine, cyclamates, sucralose, monellin and thaumatin.

13. The sweetener composition of claim 11 which is granulated.

14. The sweetener composition of claim 11 wherein said product has the sweetness of sucrose on a per weight basis.

15. The sweetener composition of claim 11 which is characterized by comprising less than 2 calories per gram.

16. A method for reducing the calorie content of a food product comprising sucrose or a starch hydrolyzate product comprising replacing all or a portion of said sucrose or starch hydrolyzate product with the hydroxypropyl starch hydrolyzate product of claim 1.

17. The method of claim 16 wherein substantially all of said sucrose is replaced by said hydroxypropyl starch hydrolyzate product.

18. The method of claim 16 comprising the step of incorporating a high potency sweetener into said food product.

19. The method of claim 16 wherein said food product is a baked good.

20. The method of claim 16 wherein said food product is a frozen dessert product.

21. The method of claim 16 wherein said food product is selected from the group consisting of icings and frostings.

22. The method of claim 16 wherein said food product is a dessert filling.

23. The method of claim 16 wherein said food product is a pudding.

24. The method of claim 16 wherein said food product is a confection.

25. The method of claim 16 wherein said food product is selected from the group consisting of jams jellies and preserves.

26. The method of claim 16 wherein said food product is a dry beverage mix.

27. The method of claim 16 wherein said food product is a gelatin based dessert.

28. The method of claim 16 wherein said food product is a salad dressing.

29. The method of claim 16 wherein said food product is selected from the group consisting of syrups and dessert toppings.

30. In a food product comprising sucrose or other starch hydrolyzate products, the improvement comprising replacing all or a portion of said sucrose or starch hydrolyzate product with the hydroxypropyl starch hydrolyzate product of claim 1.

31. The improved product of claim 30 wherein substantially all of said sucrose and starch hydrolyzate product is replaced by said hydroxypropyl starch hydrolyzate product.

32. The improved product of claim 30 further comprising a high potency sweetener.

33. The improved product of claim 30 wherein said food product is a baked good.

34. The improved product of claim 30 wherein said food product is a frozen dessert.

35. The improved product of claim 30 wherein said food product is selected from the group consisting of icings and frostings.

36. The improved product of claim 30 wherein said food product is a dessert filling.

37. The improved product of claim 30 wherein said food product is a pudding.

38. The improved product of claim 30 wherein said food product is a confection.

39. The improved product of claim 30 wherein said food product is selected from the group consisting of jams, jellies and preserves.

40. The product of claim 30 wherein said food product is a dry beverage mix.

41. The product of claim 30 wherein said food product is a gelatin based dessert.

42. The product of claim 30 wherein said food product is a salad dressing.

43. The product of claim 30 wherein said food product is selected from the group consisting of syrups and dessert toppings.

44. The method of claim 19 wherein said baked good is a cake.

45. The improved product of claim 33 wherein said baked good is a cake.

* * * * *